No. 845,534.
PATENTED FEB. 26, 1907.
F. W. DELANOY.
WATER CLOSET.
APPLICATION FILED MAR. 30, 1906.
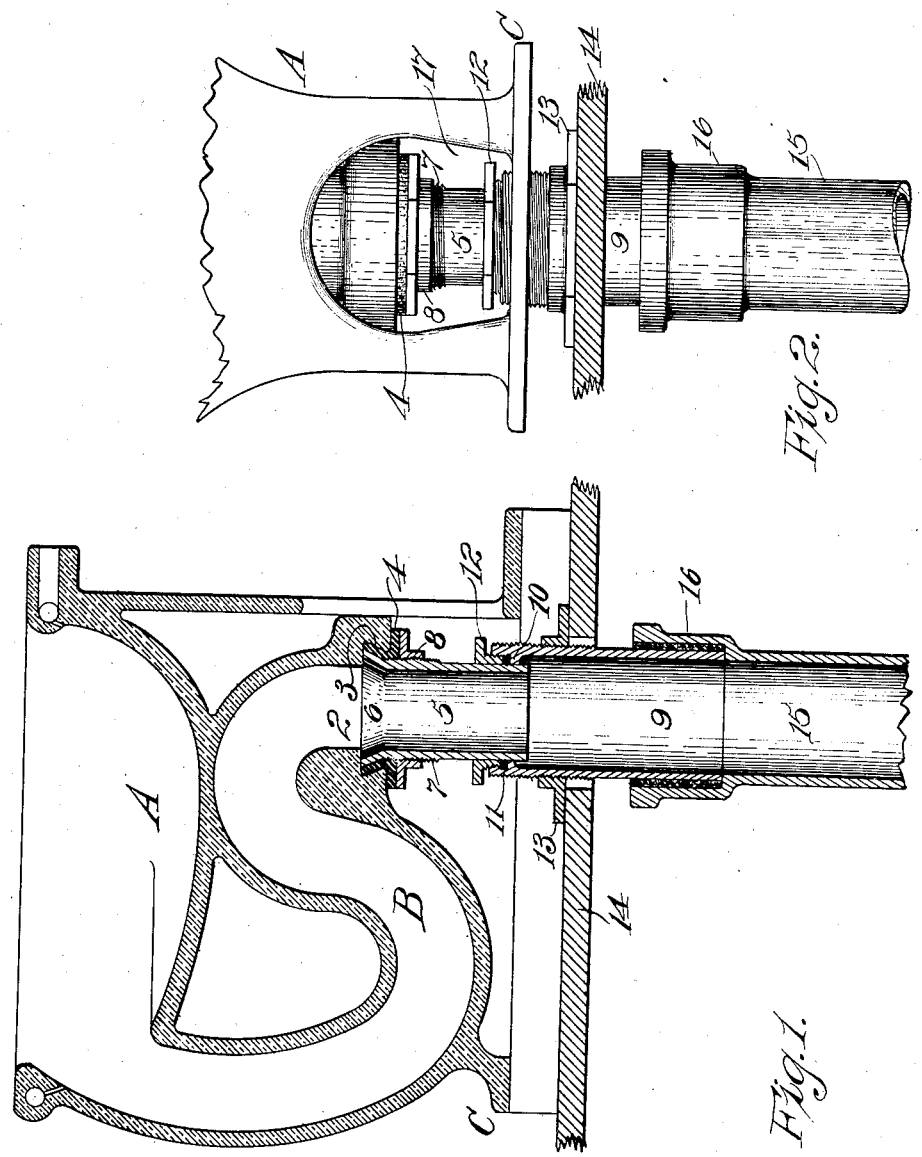
Witnesses:
Inventor:
Frederick W. Delanoy
By Geo. H. Strena
Atty

UNITED STATES PATENT OFFICE.

FREDERICK WM. DELANOY, OF OAKLAND, CALIFORNIA.

WATER-CLOSET.

No. 845,534.  Specification of Letters Patent.  Patented Feb. 26, 1907.

Application filed March 30, 1906. Serial No. 308,828.

*To all whom it may concern:*

Be it known that I, FREDERICK WM. DELANOY, a citizen of the United States, residing at Oakland, in the county of Alameda and State of California, have invented new and useful Improvements in Water-Closets, of which the following is a specification.

My invention relates to improvements in water-closets and in connections whereby they may be set and adjusted to varying conditions of the connections and whereby they are permanently sealed and easily reached for inspection or repairs.

It consists in the combination and arrangement of parts and in details of construction, which will be more fully explained by reference to the accompanying drawings, in which—

Figure 1 is a vertical section of a closet with my improvements. Fig. 2 is a rear view of same.

In apparatus of this kind it is common to make the porcelain bowl with a trap and a considerable extension downwardly, which extension is fitted into a continuing metal pipe and connected with the soil-pipe. In order to make the various metal connections, it is usual to make what are known as "wipe" joints, which joints are expensive to make and are not adjustable. In my invention I have shown means for making the proper joints at required points and means for making the connections and adjusting them to varying relative positions of the bowl and the connecting-pipes.

As shown in the drawings, A is a porcelain bowl having the usual trap B and terminating at a point just below the upper bend of the trap, as shown at 2, instead of being continued down, so as to connect with the metal pipes below the floor. The bowl has the usual base or support C. At the point 2, where connection is to be made with the metal pipe, the bowl is made with a dovetailed or undercut countersunk depression 3 of larger diameter than that of the discharge-passage at 2. Within this is fitted a rubber gasket, as 4.

5 is a tube which is designed to form the continuation from the trap of the bowl, and this tube has its lower portion made cylindrical. The upper end is made flaring or divergent, as shown at 6, and this divergent or flaring portion is fitted within the gasket 4, as shown. Below this gasket the exterior of the tube 5 is threaded, as shown at 7, and 8 is a lock-nut fitting the screw-threads and turnable thereon, so that as the lock-nut is turned it draws the tube 5 downwardly, forcing the divergent portion 6 into such contact with the gasket 4 that the latter will be strongly compressed in the socket 3, in which it is fitted, and a tight joint made and the pipe 5 locked firmly to the bowl. Below the sleeve 5 is a second pipe 9, of larger diameter than the sleeve 5, having an annular rim, as at 10, within which the sleeve 5 is freely slidable. Above this rim is fitted a packing, as at 11, and a gland or follower 12 serves to compress the packing and make a tight joint around the sleeve 5.

The outside of the pipe 9 is screw-threaded, and a flange 13 is threaded to fit. This flange may rest upon the floor, as shown at 14, and it will be seen that by means of this flange the pipe 9 may be raised or depressed to fit the sleeve 5, also to fit the joint, and the parts can thus be accommodated to varying positions of the bowl and the metal connecting parts. Thus the bowl may be set higher or lower with relation to the floor, and the soil-pipe may also terminate at a point higher or lower, while the adjustments here shown will enable me to accurately fit the parts and make tight joints therewith.

15 represents the soil-pipe, having the enlarged end 16, within which the lower end of the pipe 9 is fitted.

The joint is formed between the pipes 9 and 15 by calking between the pipe 9 and the enlarged socket 16, the lower end of the pipe 9 making a close fit with the shoulder at the bottom of the socket and continuous with the soil-pipe 15.

In order to render these pipes and connections readily accessible, the bowl A is formed with an opening of considerable size at the lower rear portion, as shown at 17, this being possible by reason of the short discharge end of the bowl, and the pipes and connections 5 and 9 are exposed through this opening and readily accessible to determine that all these joints are tight or to adjust or repair if necessary.

Having thus described my invention, what I claim, and desire to secure by Letters Patent, is—

1. In a closet, a bowl having a trap, and a conical countersunk channel at the discharge end of the trap, a sleeve having the upper end diverged to substantially fit the countersunk channel, the diameter of the channel and also the diameter of the upper end of the sleeve being in excess of the diameter of the discharge-passage of the trap whereby the inner wall of the sleeve is located outside of the vertical plane of the inner wall of the discharge-passage and the upper end of the sleeve is adapted to abut the shoulder formed by the channel, a gasket fitting between the upper end of the sleeve and the interior of the channel, and a screw-threaded lock-nut turnable upon corresponding threads on the sleeve whereby the parts are locked and sealed.

2. In a water-closet, a basin having a trap, with a terminal countersunk channel, a tube or sleeve threaded upon the outer side having the upper end made divergent to fit the countersunk channel of the bowl-discharge, the diameter of the channel and also the diameter of the upper end of the sleeve being in excess of the diameter of the discharge-passage of the trap whereby the inner wall of the sleeve is located outside of the vertical plane of the inner wall of the discharge-passage and the upper end of the sleeve is adapted to abut the shoulder formed by the channel, a flanged gasket fitting the channel and inclosing the upper end of the sleeve, and a threaded nut turnable upon the threads of the sleeve whereby the latter is drawn downward and the gasket compressed to form a joint.

3. In a closet, a bowl having a trap, a discharge, a sleeve and joint-forming means between the sleeve and the trap, a tube in line with the sleeve having an annular flange through which the lower end of the sleeve extends, a stuffing-box and gland forming a joint between the sleeve and the pipe, screw-threads formed upon the exterior of the pipe, and a threaded floor-flange engaging said threads, whereby the pipe may be adjusted with relation to the floor.

4. In a closet, a basin having a trap, a metal sleeve, an interlocking, disengageable joint formed between the upper end of the sleeve and the discharge end of the trap, a pipe in line with the sleeve having a stuffing-box and gland through which a tight and adjustable joint of the sleeve is formed, a screw-threaded floor-flange engaging corresponding threads upon the exterior of the pipe whereby the latter is adjustable with relation to the sleeve, and a soil-pipe having a socket and joint-forming devices at the junction of the two.

5. In a water-closet having a trap and a terminal discharge, a sleeve and a detachable joint-forming device between the sleeve and trap, a soil-pipe in line with the sleeve, and an interposed pipe-section forming a fixed joint with the soil-pipe, and a slidably-adjustable joint with the sleeve, said pipe-section being externally threaded, and a threaded floor-flange engaging the threaded portion of the pipe-section and adjusting said section.

In testimony whereof I have hereunto set my hand in presence of two subscribing witnesses.

FREDERICK WM. DELANOY.

Witnesses:
S. H. NOURSE,
JESSIE C. BRODIE.